US008286212B2

(12) United States Patent
Gulati

(10) Patent No.: US 8,286,212 B2
(45) Date of Patent: Oct. 9, 2012

(54) ON-DEMAND ASSET DISTRIBUTION

(75) Inventor: Kunal Gulati, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 11/894,011

(22) Filed: Aug. 17, 2007

(65) Prior Publication Data

US 2009/0049486 A1 Feb. 19, 2009

(51) Int. Cl.
*H04N 7/173* (2011.01)
(52) U.S. Cl. ............... 725/87; 725/93; 725/95; 725/151
(58) Field of Classification Search .................. None
See application file for complete search history.

(56) References Cited

U.S. PATENT DOCUMENTS

| | | | |
|---|---|---|---|
| 6,385,596 B1 | 5/2002 | Wiser et al. | |
| 7,010,801 B1 | 3/2006 | Jerding et al. | |
| 7,020,704 B1 | 3/2006 | Lipscomb et al. | |
| 7,080,400 B1 * | 7/2006 | Navar | 725/139 |
| 7,336,784 B2 * | 2/2008 | Zuili | 380/200 |
| 7,995,603 B2 * | 8/2011 | Revital et al. | 370/432 |
| 2003/0018978 A1 | 1/2003 | Singal et al. | |
| 2003/0131353 A1 * | 7/2003 | Blom et al. | 725/25 |
| 2004/0117839 A1 | 6/2004 | Watson et al. | |
| 2004/0148344 A1 * | 7/2004 | Navar et al. | 709/203 |
| 2006/0020984 A1 | 1/2006 | Ban et al. | |
| 2006/0047957 A1 * | 3/2006 | Helms et al. | 713/165 |
| 2006/0218601 A1 | 9/2006 | Michel | |
| 2007/0016530 A1 | 1/2007 | Stasi et al. | |
| 2007/0038567 A1 | 2/2007 | Allaire et al. | |
| 2007/0067800 A1 * | 3/2007 | Wachtfogel et al. | 725/42 |
| 2007/0277205 A1 * | 11/2007 | Grannan | 725/80 |
| 2008/0235746 A1 * | 9/2008 | Peters et al. | 725/111 |

OTHER PUBLICATIONS

"BitBand Inc. Video on Demand Solution Overview", Date: Dec. 2003, pp. 1-22.
Bellavista, et al., "How to Support Internet-based Distribution of Video on Demand to Portable Devices", pp. 1-7.
Liste, Matthew, "Content Delivery Network (CDN)—A Reference Guide", Date: Apr. 2001, Università di Bologna, pp. 1-24.

\* cited by examiner

*Primary Examiner* — Jason Salce
*Assistant Examiner* — Chenea Smith
(74) *Attorney, Agent, or Firm* — Wolfe-SBMC

(57) ABSTRACT

On-demand asset distribution is described. In embodiment(s), a client device can maintain an on-demand asset received from a content distributor, such as with a recording media. The client device can allocate upstream bandwidth for distribution of segments of video data for the on-demand asset to other requesting client devices. When the client device that maintains the on-demand asset receives a request from another client device for the on-demand asset, the segments of the video data for the on-demand asset can be communicated to the requesting client device utilizing the allocated upstream bandwidth.

17 Claims, 8 Drawing Sheets

ON-DEMAND ASSET DISTRIBUTION

BACKGROUND

On-demand programming choices, such as video on-demand movies and previously broadcast television programs, continue to increase in popularity. More viewers are choosing to search for and request media content when convenient for viewing rather than at a scheduled broadcast time. As a result, content distributors are having to implement more and larger video on-demand (VOD) servers to handle the increasing number of viewer requests for the movies, programs, and other on-demand television media content. Content distributors are also faced with the need to increase the bandwidth and server processing capabilities and requirements of the VOD servers to accommodate the many on-demand requests for the on-demand media content, assets, and other television media content.

SUMMARY

This summary is provided to introduce simplified concepts of on-demand asset distribution. The simplified concepts are further described below in the Detailed Description. This summary is not intended to identify essential features of the claimed subject matter, nor is it intended for use in determining the scope of the claimed subject matter.

In embodiment(s) of on-demand asset distribution, a client device can maintain an on-demand asset received from a content distributor, such as with a recording media. The client device can allocate upstream bandwidth for distribution of segments of video data for the on-demand asset to other requesting client devices. When the client device that maintains the on-demand asset receives a request from another client device for the on-demand asset, the segments of the video data for the on-demand asset can be communicated to the requesting client device utilizing the allocated upstream bandwidth.

In other embodiment(s) of on-demand asset distribution, a content distributor maintains on-demand assets that can each be requested by client devices that store the on-demand assets for on-demand viewing. The content distributor can receive requests from the client devices for an on-demand asset, distribute the on-demand asset to the requesting client devices, and maintain a list of the client devices that have been distributed the on-demand asset. When the content distributor receives a new request from an additional client device for the on-demand asset, the content distributor can initiate that the additional client device receive segments of the on-demand asset from any one or more of the client devices that have received and stored the requested on-demand asset.

In other embodiment(s) of on-demand asset distribution, an on-demand asset can be a combination of video data, audio data, security data, and/or metadata. To maintain the integrity and/or security of an asset distribution system, the video data of segments of an on-demand asset can be distributed from one client device to another that requests the on-demand asset. The client device that requests the on-demand asset can then request and receive the audio data and the security data from the content distributor to enable rendering the on-demand asset for viewing. Alternatively, the video data and the audio data of the segments of the on-demand asset can be received from a client device, and the security data of the on-demand asset can be received from the content distributor to enable rendering the on-demand asset for viewing.

BRIEF DESCRIPTION OF THE DRAWINGS

Embodiments of on-demand asset distribution are described with reference to the following drawings. The same numbers are used throughout the drawings to reference like features and components.

DETAILED DESCRIPTION

Embodiments of on-demand asset distribution provide that client devices can receive and store on-demand assets, and then together, distribute bits or segments of the assets to additional client devices that request delivery of the same on-demand asset. The client devices act as "agents" for a content distributor to deliver some or all of the data for a requested on-demand asset. Security of the on-demand asset can be maintained by separating the distribution of the content data of the on-demand asset to a requesting client device. For example, the audio and security data of the on-demand asset can be distributed from the content provider, while the video and associated metadata is received at the requesting client device from the other client devices that have already received portions of the on-demand asset. Any combination of the various data streams for an on-demand asset (e.g., video data, audio data, security data, and metadata) can be implemented in a distribution scheme to maintain control and security of the on-demand asset, yet off-load the bandwidth and server processing requirements of the content distributor.

While features and concepts of the described systems and methods for on-demand asset distribution can be implemented in any number of different environments, systems, and/or various configurations, embodiments of on-demand asset distribution are described in the context of the following example systems and environments.

Figure 1:
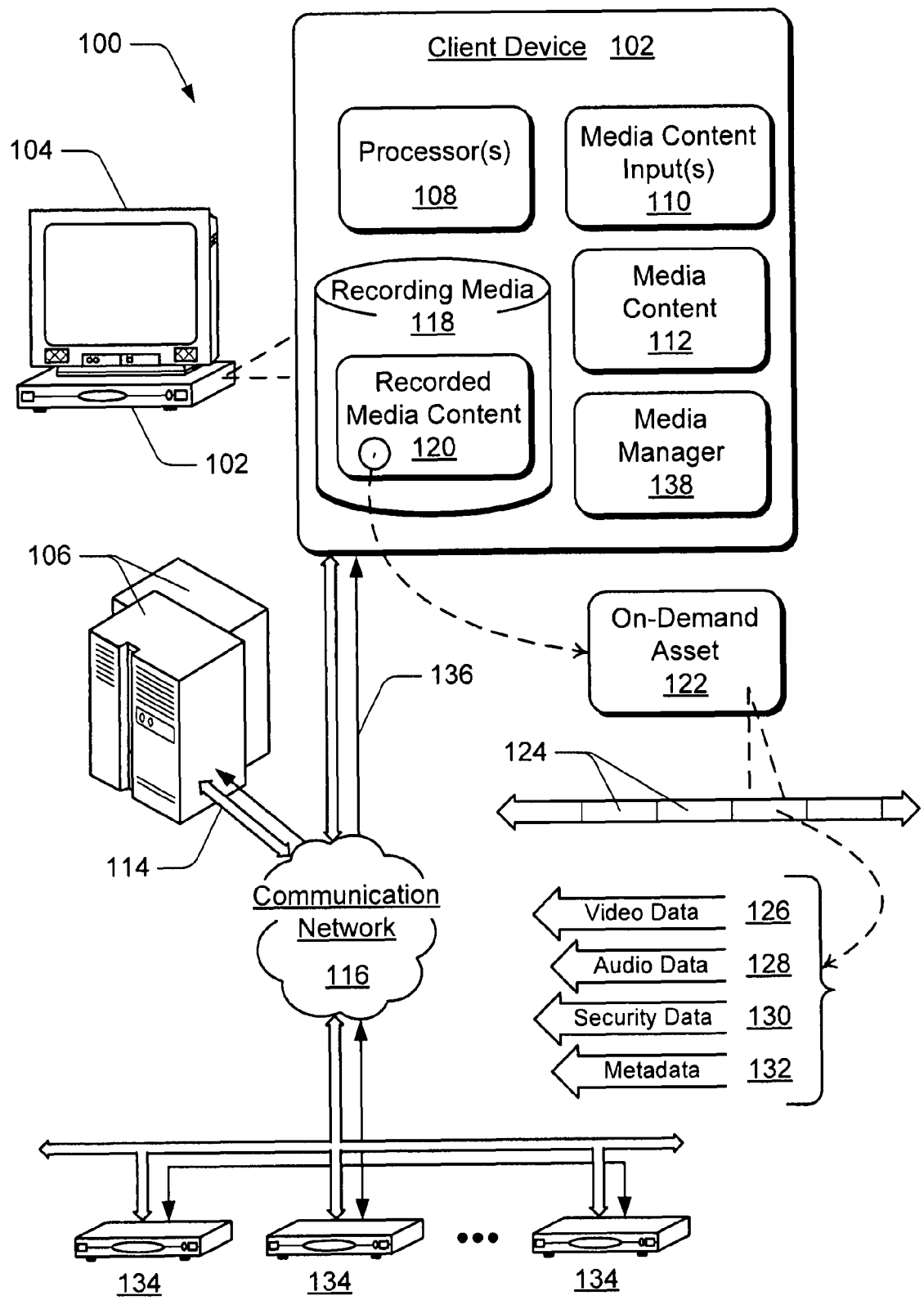
FIG. 1 illustrates an example system in which embodiments of on-demand asset distribution can be implemented.

FIG. 1 illustrates an example system 100 in which various embodiments of on-demand asset distribution can be implemented. In this example, system 100 includes a television client device 102, a display device 104, and content distributor(s) 106. The client device 102 and display device 104 together are just one example of a television client system that renders audio, video, and/or image data. The display device 104 can be implemented as any type of television, LCD, or similar display system.

Client device 102 can be implemented as any one or combination of a television set-top box, a digital video recorder (DVR) and playback system, an appliance device, a gaming console, and/or as any other type of television client device or computing-based device that may be implemented in a television entertainment and information system. Additionally, client device 102 can be implemented with any number and combination of differing components as further described with reference to the example device shown in FIG. 7. Client device 102 may also be associated with a user or viewer (i.e., a person) and/or an entity that operates the device such that a client device describes logical clients that include users, software, and/or devices.

In the example system 100, client device 102 includes one or more processors 108 (e.g., any of microprocessors, controllers, and the like), media content inputs 110, and media content 112 (e.g., received media content or media content that is being received). The media content inputs 110 can include any type of communication interfaces and/or data inputs, such as Internet Protocol (IP) inputs over which streams of television media content (e.g., IPTV media content) are received via an IP-based network 114 and/or a communication network 116. The television client device 102 is configured for communication with the content distributor(s) 106 via the IP-based and communication networks. A media content input 110 can receive television media content 112 as an IPTV multicast from a content distributor 106. In addition, the media content inputs 110 can include any type of broadcast and/or over-the-air inputs via which media content is received.

A content distributor 106 can distribute media content to any number of television client devices as an IPTV multicast via the IP-based network 114 and/or the communication network 116. As described throughout, the media content can include television programs (or programming) which may be any form of programs, commercials, music, movies, and video-on-demand media content. Other media content can include interactive games, network-based applications, and any other audio, video, and/or image content.

The IP-based network 114 can be implemented as part of the communication network 116 that facilitates media content distribution and data communication between the content distributor(s) 106 and any number of client devices, such as client device 102. The communication network 116 can be implemented as part of a media content distribution system using any type of network topology and/or communication protocol, and can be represented or otherwise implemented as a combination of two or more networks.

Client device 102 also includes recording media 118 that maintains recorded media content 120, such as television programs or an on-demand movie recorded for viewing at a later time. The media content 112 and/or the recorded media content 120 can include any type of television media content, as well as any other audio, video, and/or image content received from any type of media content source. In an embodiment, the recorded media content 120 can include an on-demand asset 122, such as a video on-demand movie received from a content distributor 106 that is maintained at the client device 102 for on-demand viewing.

The on-demand asset 122 can be organized or distributed into any number of indexed data segments 124. The data segments may be sized based on a number of data blocks, or optionally based on a playback time of the content, such as thirty (30) minute segments. The data segments 124 can be indexed with any type of indexing mechanism that utilizes any form of media content identifiers or indexing protocol. For example, a television program or movie (e.g., media content) may be segmented by any size of indexed and unique data blocks of the media content. Each segment 124 of an on-demand asset can include at least video data 126 (e.g., MPEG2 video), audio data 128, security data 130, and other associated data 132 (e.g., metadata). The video data 126 of the media content can include a save-on attribute such that the video content remains encrypted when stored on the recording media 118.

The client device 102 can receive the on-demand asset 122 and then distribute segments 124 of the asset to any number of additional client devices 134 that request delivery of the same on-demand asset. Client device 102, and subsequently any of the client devices 134, act as "agents" for a content distributor 106 to deliver some or all of the data segments 124 for a requested on-demand asset.

Each of the client devices 102 and 134 can allocate a percentage of upstream bandwidth to a content distributor 106, and then communicate segments of an on-demand asset to a client device that requests the on-demand asset. A content distributor 106 can receive an upstream bandwidth allocation and/or a request for an on-demand asset, and a client device can receive segments of a requested on-demand asset via a two-way data communication link 136 of the communication network 116. A client device has an upload HTTP port to receive on-demand asset segment data from other client devices. It is contemplated that any one or more of the arrowed communication links 114, 136 along with communication network 116 facilitate two-way data communication, such as between the television client devices 102 and 134, and from a television client device to a content distributor 106 and vice-versa.

Client device 102 also includes a media manager 138 that can be implemented as computer-executable instructions and executed by the processor(s) 108 to implement embodiments of on-demand asset distribution. In an embodiment, the media manager 138 can allocate the upstream bandwidth to a content distributor 106 for the client device 102. The media manager 138 can also receive a request for the on-demand asset 122 from a client device 134, and initiate communication of one or more segments 124 of the requested on-demand asset 122 to the client device 134.

In another embodiment, the media manager can initiate a request for an additional on-demand asset from a content distributor 106, and receive a list of the other television client devices 134 that have already been distributed the requested on-demand asset. Based on the received list of client devices 134, the media manager can initiate communication of a request for the additional on-demand asset to the other client devices 134 that then provide segments of the requested on-demand asset to television client device 102.

Figure 2:
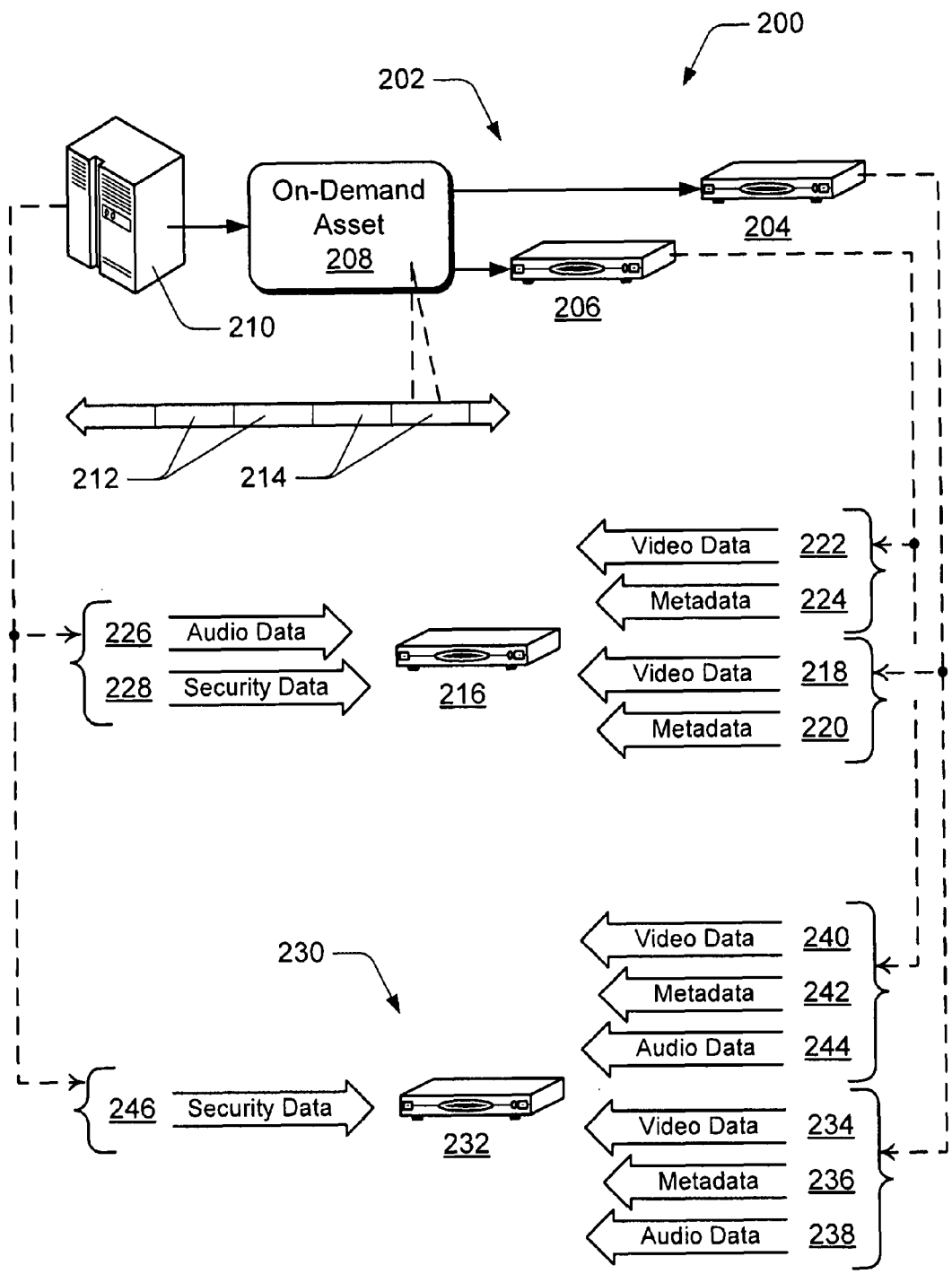
FIG. 2 illustrates various implementations to distribute segments of an on-demand asset to requesting client devices in embodiments of on-demand asset distribution.

FIG. 2 illustrates various implementations 200 to distribute segments of an on-demand asset to requesting client devices in embodiments of on-demand asset distribution. In an implementation 202, any number of client devices (204 and 206 in this example) each maintain a copy of an on-demand asset 208 that has been received from a content distributor 210. The on-demand asset includes various indexed data segments 212, 214 that each include at least video data, audio data, security data, and other associated data (e.g., metadata).

An additional client device 216 can communicate a request to the content distributor 210 for the on-demand asset 208 and receive a list that indicates client devices 204, 206 have a stored copy of the on-demand asset 208. Client device 216 can then request the on-demand asset 208 from the other client devices 204, 206.

In this example, client device 204 communicates video data 218 and metadata 220 for the data segments 212 of the on-demand asset to the requesting client device 216. Similarly, client device 206 communicates video data 222 and metadata 224 for the data segments 214 of the on-demand asset 208 to the requesting client device 216. The content distributor 210 communicates audio data 226 and security data 228 for the on-demand asset 208 to the requesting client device 216.

In this asset distribution scheme, the security of the on-demand asset 208 is maintained by separating the distribution of the various content data of the on-demand asset to a new, requesting client device. In this example, the audio and security data can be distributed from the content distributor 210, while the video and associated metadata is received at the requesting client device 216 from the other client devices 204, 206 that have already received portions or segments of the on-demand asset. Having the additional client devices 204, 206 act as "agents" for the content distributor 210 to deliver some or all of the data segments 212, 214 for the requested on-demand asset 208 off-loads bandwidth and/or server processing requirements at the content distributor 210.

Additionally, this example is merely illustrative of one embodiment of on-demand asset distribution. In practice, any number of client devices (such as described with reference to client device 102 shown in FIG. 1) can allocate upstream bandwidth to one or more content distributors, and contribute asset data segments to another requesting client device. Further, any distribution combination of the content data can be configured to both maintain control and security of the process, yet off-load bandwidth and server processing requirements.

For example, in an alternate implementation 230, an additional client device 232 can communicate a request to the content distributor 210 for the on-demand asset 208 and receive a list that indicates client devices 204, 206 have a stored copy of the on-demand asset 208. Client device 232 can then request the on-demand asset 208 from the other client devices 204, 206.

In this example, client device 204 communicates video data 234, metadata 236, and audio data 238 for data segments of the on-demand asset to the requesting client device 232. Similarly, client device 206 communicates video data 240, metadata 242, and audio data 244 for other data segments of the on-demand asset 208 to the requesting client device 232. The content distributor 210 communicates security data 246 for the on-demand asset 208 to the requesting client device 232.

As described above, the security of the on-demand asset 208 is maintained by separating the distribution of the various content data of the on-demand asset to a new, requesting client device. In this example, the security data is distributed from the content distributor 210, while the video data, audio data, and associated metadata is received at the requesting client device 232 from other client devices that have already received portions or segments of the on-demand asset.

In an alternate implementation to maintain control and security of the distribution process, the content distributor 210 can request and receive the audio data for a particular on-demand asset from various client devices, process the received audio data segments for distribution, and then communicate the audio data to a client device that requests the on-demand asset. For example, content distributor 210 can request and receive the audio data 238, 244 from respective client devices 204, 206, and then process the received audio data segments for distribution as the audio data 226 to requesting client device 216.

Figure 3:
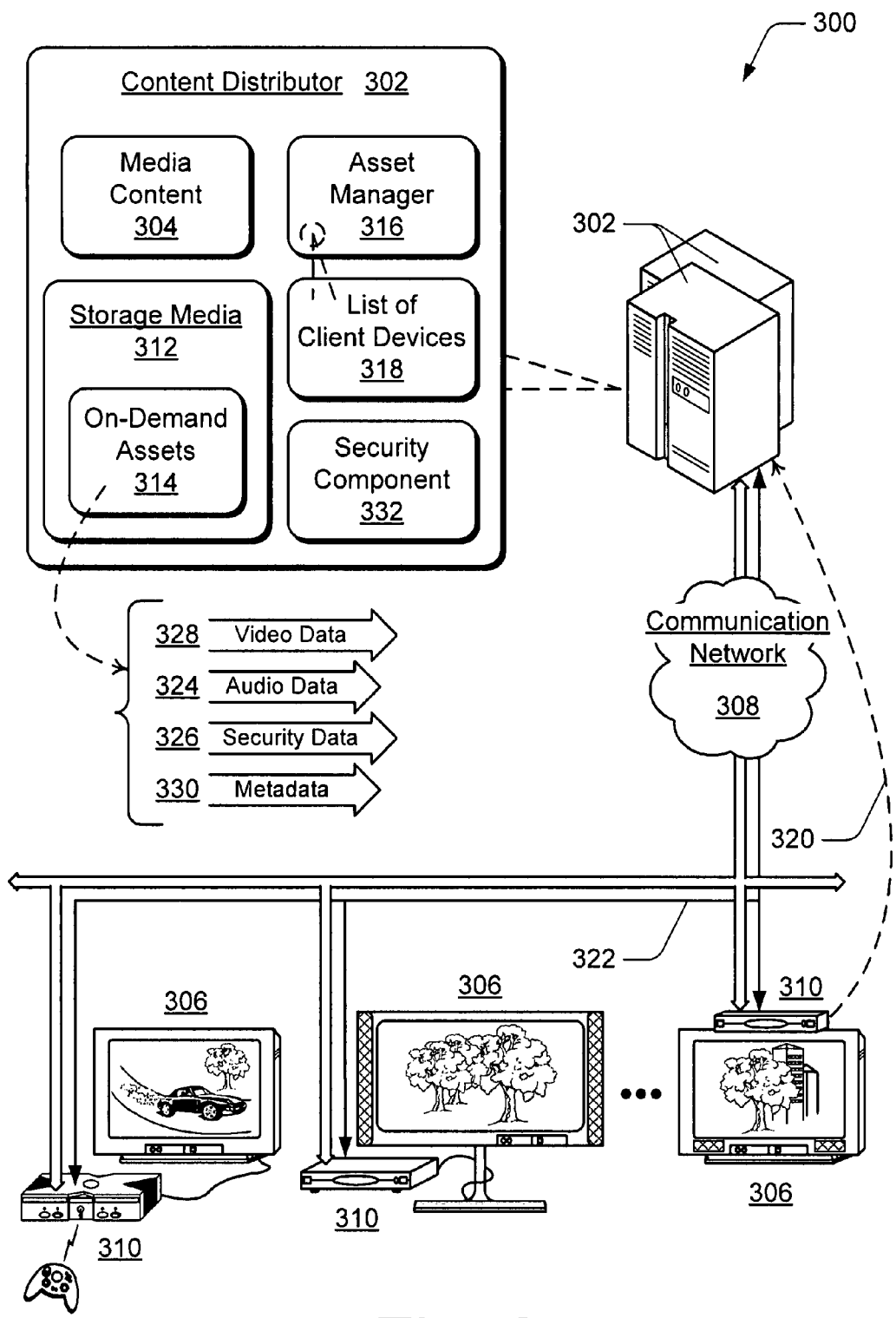
FIG. 3 illustrates another example system in which embodiments of on-demand asset distribution can be implemented.

FIG. 3 illustrates another example system 300 in which various embodiments of on-demand asset distribution can be implemented. The example system 300 includes content distributor(s) 302 that communicate media content 304 to any number of various television client systems 306 via a communication network 308. An example of a communication network is described with reference to communication network 116 shown in FIG. 1. An example of a client device in a television client system 306 is described with reference to television client device 102 as also shown in FIG. 1. The communication network 308 can be implemented to include an IP-based network and/or a broadcast network that both facilitate media content distribution and data communication between the content distributor(s) 302 and any number of television client devices.

Each of the television client systems 306 include a respective client device 310 and a display device, such as any type of television, monitor, LCD, or similar television-based display system that renders audio, video, and/or image data. Any of the client devices 310 can be implemented as any one or combination of a television client device, a digital video recorder (DVR), an appliance device, a gaming console, a computer device, a portable device, and/or as any other type of client device.

Any of the client devices 310 of the respective client systems 306 can be implemented with one or more processors, a communication module, memory components, and a media content rendering system. Any of the client devices 310 can also include a media manager, such as media manager 138 described with reference to FIG. 1. Additionally, each of the client devices 310 can be configured for communication with any number of different content distributors 302 to receive any type of media content 304 via the communication network 308. Further, any of the client devices 310 can be implemented with any number and combination of differing components as further described with reference to the example device shown in FIG. 7.

In this example, a content distributor 302 includes storage media 312 to store or maintain on-demand assets 314 that can each be requested by client devices that store the on-demand assets for on-demand viewing. The content distributor 302 also includes an asset manager 316 to implement embodiments of on-demand asset distribution. The asset manager can be implemented to maintain a list 318 of the client devices that have been previously distributed on-demand assets 314. The list 318 of client devices can include on-demand asset identifiers to identify which of the client devices have received particular on-demand assets, and the list 318 can include an indication of the upstream bandwidth allocation from each of the client devices.

The asset manager 316 can receive a request 320 from a client device 310 for an on-demand asset 314, and initiate distribution of the requested on-demand asset to the requesting client device. The content distributor 302 can receive requests from the client devices 310, such as request 320, via a two-way data communication link 322 of the communication network 308. It is contemplated that any one or more of the arrowed communication links 322 along with communication network 308 facilitate two-way data communication, such as from a client device 310 to a content distributor 302 and vice-versa.

When the asset manager 316 receives a request from a client device 310 for an on-demand asset 314, the asset manager 316 can initiate that the requesting client device receive segments of the on-demand asset from one or more of the other client devices that store the on-demand asset. In an embodiment, the asset manager 316 can initiate the requesting client device receiving the segments of the on-demand asset by communicating the list 318 of the client devices that store the on-demand asset to the requesting client device. The requesting client device can then request the on-demand asset from the other client devices that communicate segments of the requested on-demand asset to the requesting client device.

In another embodiment, the asset manager 316 can receive a request from a client device 310 for an on-demand asset 314. The asset manager 316 can then initiate the requesting client device receiving the on-demand asset by directing the other client devices to each communicate one or more of the segments of the on-demand asset to the requesting client device.

As described above, the security of an on-demand asset 314 is maintained by separating the distribution of the various content data of the on-demand asset to a requesting client device. For example, the audio data 324 and security data 326 can be distributed from the content distributor 302, while the video data 328 and associated metadata 330 is received at the requesting client device from the other client devices that have already received the on-demand asset. Alternatively, the security data 326 can be distributed from the content distributor 302, while the video data 328, audio data 324, and associated metadata 330 is received at the requesting client device from the other client devices that have already received the on-demand asset.

In the example system 300, the content distributor 302 also includes a security component 332 that can be implemented to distribute the security data 326 to a client device that requests an on-demand asset, and receives segments of the on-demand asset from other client devices. The security data 326 distributed by the security component 332 can include encryption keys, for example, to decrypt the segments of the on-demand asset received from the other client devices.

Generally, any of the functions, methods, procedures, and modules described herein can be implemented using hardware, software, firmware (e.g., fixed logic circuitry), manual processing, or any combination thereof. A software implementation of a function, method, procedure, or module represents program code that performs specified tasks when executed on a computing-based processor. Example methods 400, 500, and 600 described with reference to respective FIGS. 4, 5, and 6 may be described in the general context of computer-executable instructions. Generally, computer-executable instructions can include applications, routines, programs, objects, components, data structures, procedures, modules, functions, and the like that perform particular functions or implement abstract data types.

The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 4:
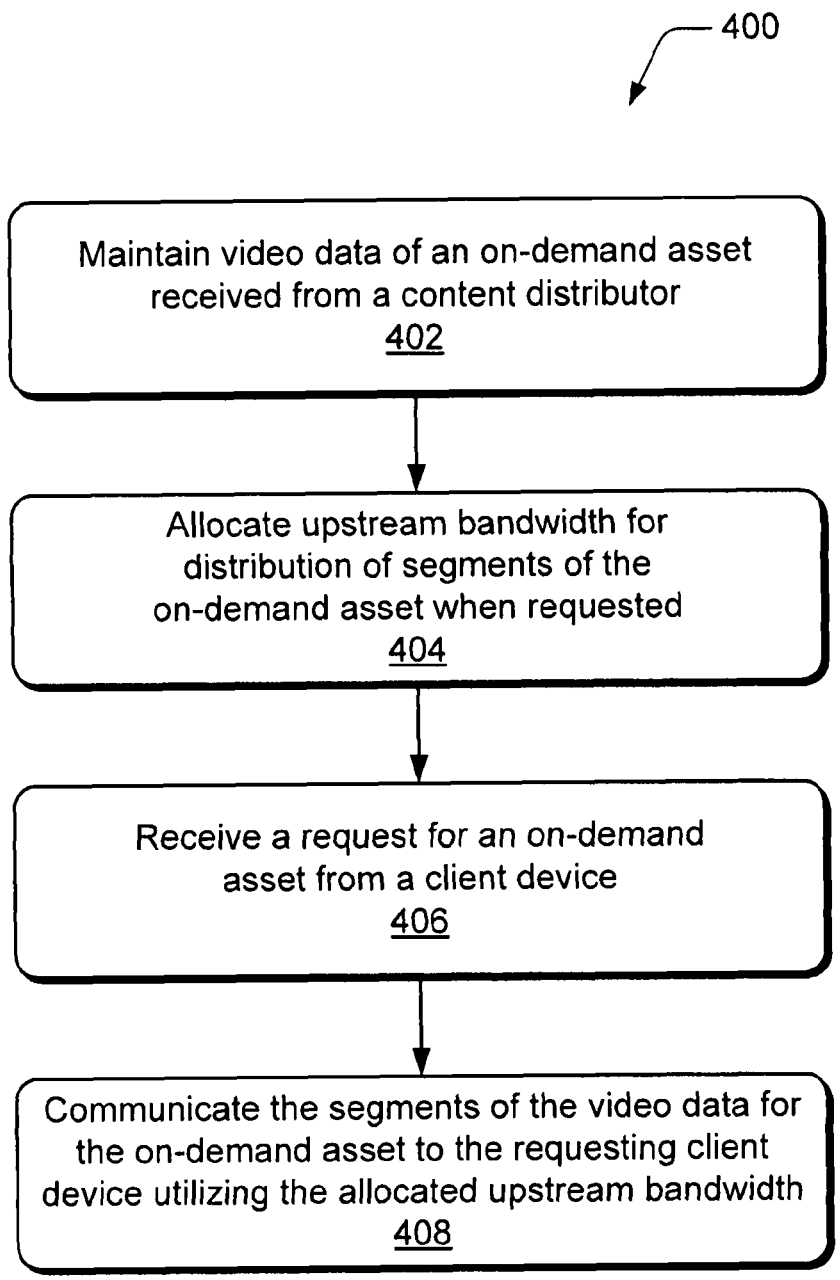
FIG. 4 illustrates example method(s) for on-demand asset distribution in accordance with one or more embodiments.

FIG. 4 illustrates example method(s) 400 of on-demand asset distribution, and is described with reference to a television client device. The order in which the method is described is not intended to be construed as a limitation, and any number of the described method blocks can be combined in any order to implement the method, or an alternate method.

At block 402, an on-demand asset received from a content distributor is maintained. For example, client device 102 (FIG. 1) includes recording media 118 to store or otherwise maintain recorded media content 120, such as the video data for an on-demand asset 122 received from a content distributor 106.

At block 404, upstream bandwidth is allocated for distribution of segments of the on-demand asset when requested. For example, client device 102 communicates with content distributor 106 via the two-way data communication link 136 and/or the communication network 116. The client device 102 allocates a percentage of the communication bandwidth for upstream distribution of segments of an on-demand asset when requested by other client devices.

At block 406, a request for an on-demand asset is received from a client device. For example, client device 102 can receive a request from another client device 134 for an on-demand asset 122 that is stored by the client device 102. The requesting client device 134 can receive a list 318 (FIG. 3) of client devices that have been distributed and store the on-demand asset. The requesting client device 134 can then communicate a request for the on-demand asset to those listed client devices.

At block 408, the segments of the video data for the requested on-demand asset are communicated to the requesting client device utilizing the allocated upstream bandwidth. For example, client device 102 communicates segments 124 of the video data for the requested on-demand asset 122 to the requesting client device 134 via the two-way data communication link 136 and/or the communication network 116.

The on-demand asset 122 can include at least the video data 126, audio data 128, security data 130, and/or other data 132 (e.g., metadata). In an embodiment, the video data 126 and/or the metadata 132 of the segments 124 of the on-demand asset can be communicated from client device 102 to the requesting client device 134. To maintain the integrity and security of the content distribution system, the requesting client device 134 can then receive the audio data 128 and/or the security data 130 of the on-demand asset 122 from the content distributor 106. Alternatively, the client device 102 can communicate any combination of the video data 126, audio data 128, and metadata 132 of the segments 124 of the on-demand asset to the requesting client device 134, and then the requesting client device 134 can receive the security data 130 from the content distributor 106.

Figure 5:
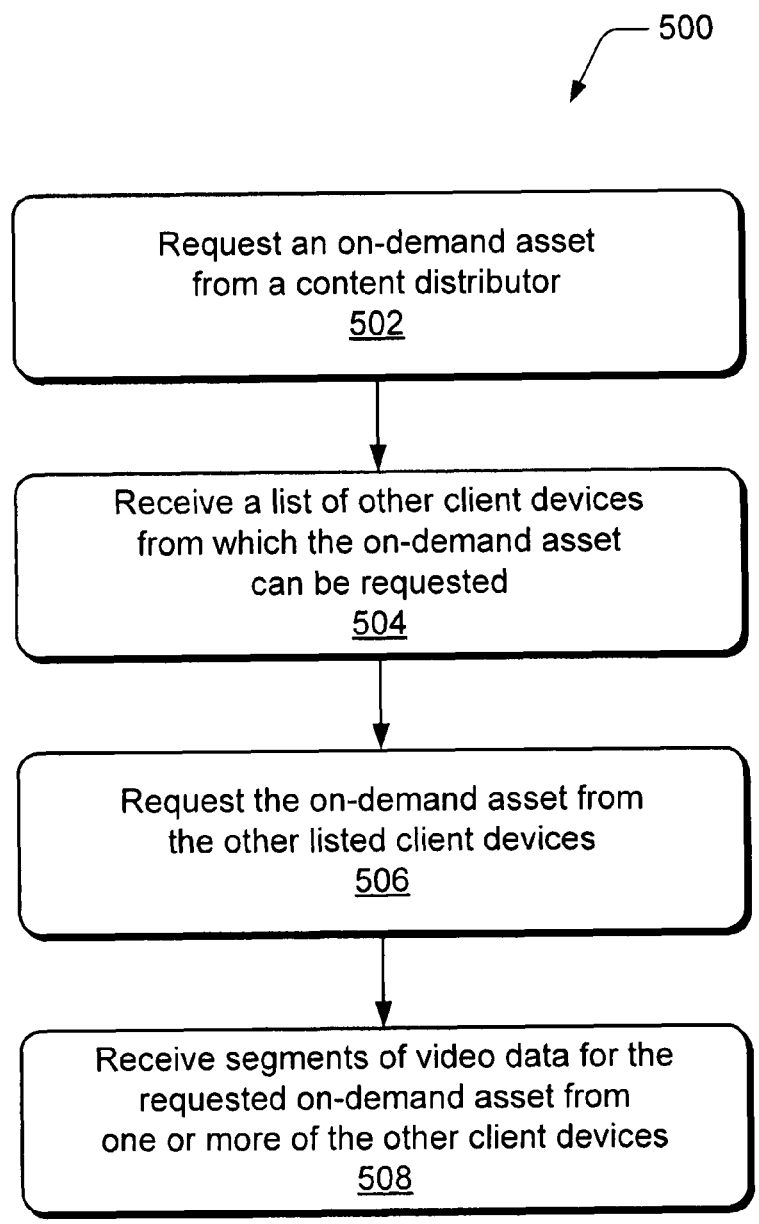
FIG. 5 illustrates example method(s) for on-demand asset distribution in accordance with one or more embodiments.

FIG. 5 illustrates example method(s) 500 of on-demand asset distribution, and is described with reference to a television client device. The order in which the method is described is not intended to be construed as a limitation, and any number of the described method blocks can be combined in any order to implement the method, or an alternate method.

At block 502, an on-demand asset is requested from a content distributor. For example, client device 102 (FIG. 1) can request an on-demand asset from content distributor 106. At block 504, a list of other client devices from which the on-demand asset can be requested is received. For example, the client device 102 can receive a list 318 from the content distributor 106 of other client devices 134 that have been distributed and store the requested on-demand asset.

At block 506, the on-demand asset is requested from the other listed client devices. For example, the requesting client device 102 communicates a request to the other listed client devices 134 for the on-demand asset. At block 508, segments of video data for the requested on-demand asset are received from one or more of the other client devices. For example, the requesting client device 102 receives segments of video data of the requested on-demand asset from the other client devices 134 that have stored the on-demand asset for distribution.

As described above, an on-demand asset can include at least video data, audio data, security data, and/or other data (e.g., metadata). In an embodiment, the video data and/or the metadata of the segments of the on-demand asset can be communicated from the listed client devices 134 to the requesting client device 102. The requesting client device 102 can then receive the audio data and the security data of the on-demand asset from the content distributor 106 to maintain the integrity and security of the content distribution system.

Figure 6:
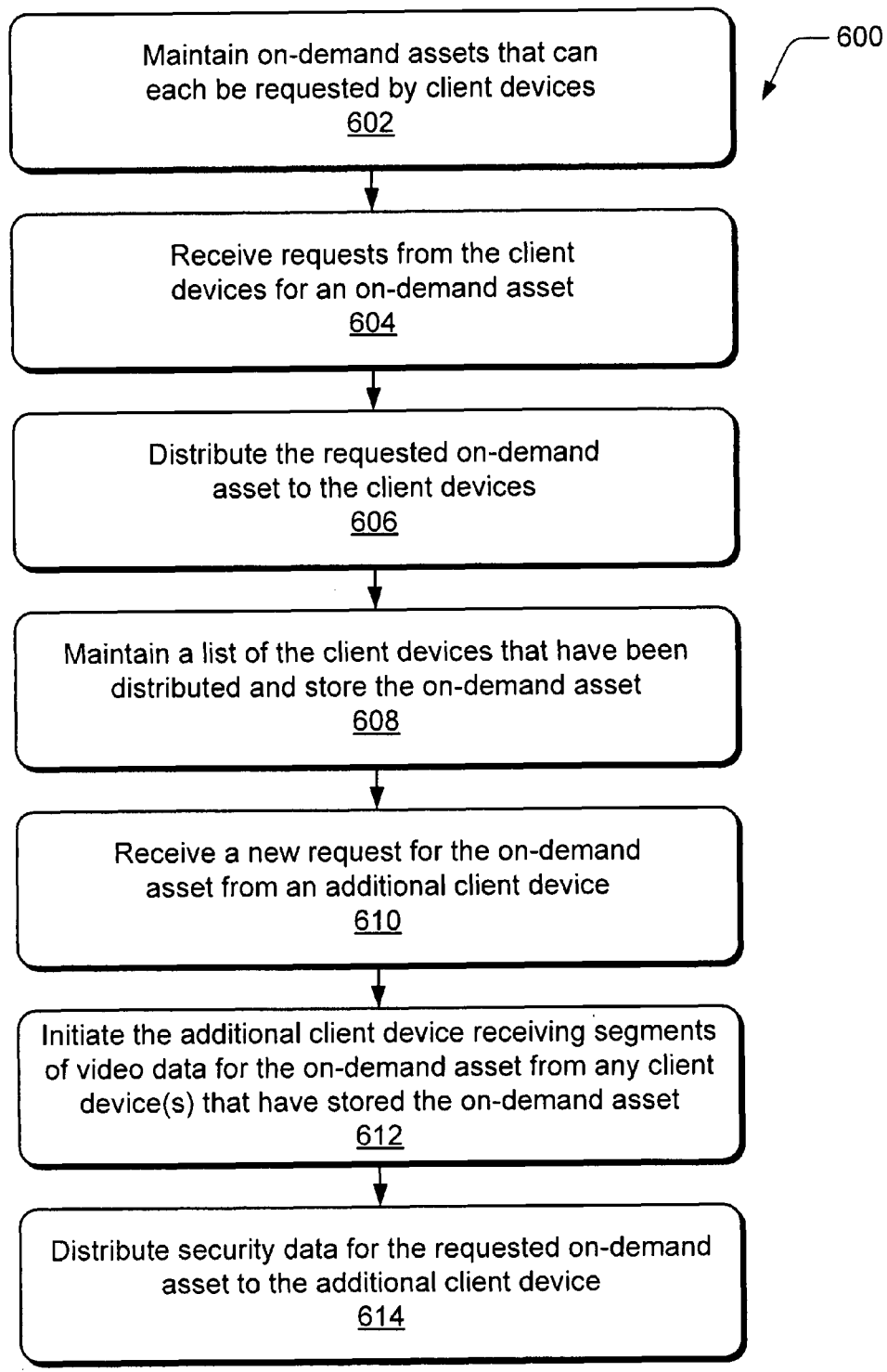
FIG. 6 illustrates example method(s) for on-demand asset distribution in accordance with one or more embodiments.

FIG. 6 illustrates example method(s) 600 of on-demand asset distribution, and is described with reference to a content distributor. The order in which the method is described is not intended to be construed as a limitation, and any number of the described method blocks can be combined in any order to implement the method, or an alternate method.

At block 602, on-demand assets that can each be requested by client devices are maintained. For example, content distributor 302 (FIG. 3) stores or otherwise maintains on-demand assets 314 with storage media 312. At block 604, requests for an on-demand asset are received from the client devices. For example, the asset manager 316 of content distributor 302 can receive requests for an on-demand asset 314 from any one or more of the client devices 310.

At block 606, the requested on-demand asset is distributed to the client devices. For example, the content distributor 302 communicates or otherwise distributes the on-demand asset to the requesting client devices 310. Any of the client devices 310 can initiate and communicate a request 320 for a particular on-demand asset to the content distributor 302. A client device 310 can then receive an on-demand asset 314 from the content distributor 302 and maintain the on-demand asset for distribution.

At block 608, a list is maintained of the client devices that have been distributed and store the on-demand asset. For example, the asset manager 316 of content distributor 302 maintains a list 318 of the client devices 310 that have requested and been distributed the on-demand asset for storage. The asset manager 316 can also maintain the list 318 of the client devices to include an allocation of upstream bandwidth from each of the client devices.

At block 610, a new request for the on-demand asset is received from an additional client device. For example, the content distributor 302 can receive another request 320 for the same on-demand asset from an additional client device 310. At block 612, the additional client device is initiated to receive segments of video data for the requested on-demand asset from any one or more of the client devices that store the on-demand asset. In an embodiment, the asset manager 316 of the content distributor 302 communicates the list 318 of the client devices that store the on-demand asset, or the video data for the on-demand asset, to the additional, requesting client device. The requesting client device can then request the segments of the on-demand asset from any of the listed client devices. In an alternate embodiment, the asset manager 316 can direct the client devices to each communicate one or more segments of the video data for the on-demand asset to the additional, requesting client device.

At block 614, security data for the requested on-demand asset is distributed to the additional client device that requests the on-demand asset. For example, the security component 332 for content distributor 302 maintains and distributes the security data 326, such as encryption keys, to the requesting client device to decrypt the segments of the on-demand asset received from the other client devices. The requesting client device can receive the video data 328, audio data 324, and/or metadata 330 of the segments of the on-demand asset from any of the other client devices 310, and then receive the security data 326 from the content distributor 302.

Figure 7:
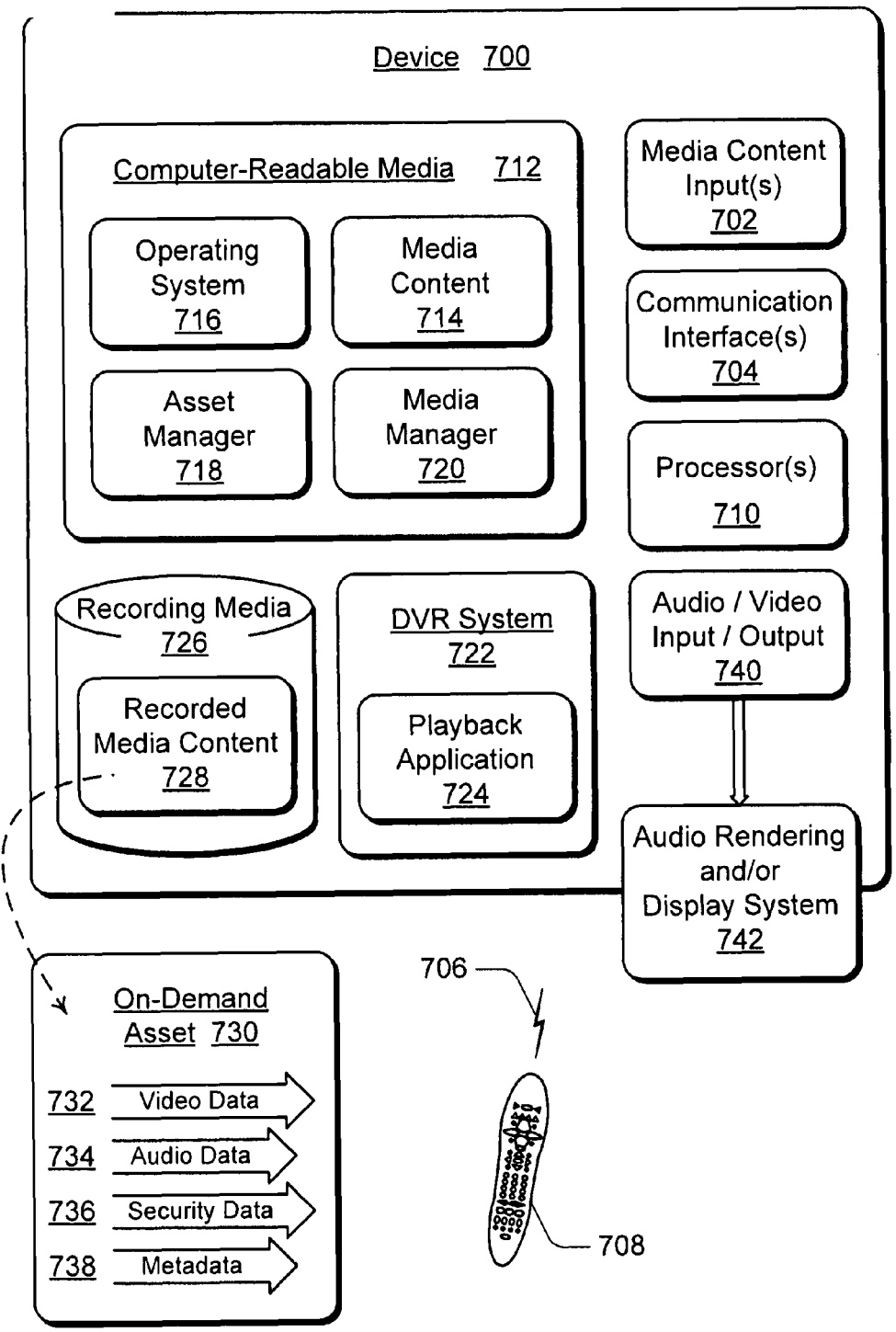
FIG. 7 illustrates various components of an example device which can implement embodiments of on-demand asset distribution.

FIG. 7 illustrates various components of an example device 700 that can be implemented as any form of a computing, electronic, appliance, television client device, or television system device to implement various embodiments of on-demand asset distribution. For example, device 700 can be implemented as a television client device or as a content distributor as shown in any of FIGS. 1-3. In various embodiments, device 700 can be implemented as any one or combination of a television client device, a digital video recorder (DVR), a gaming system or console, a computing-based device, an appliance device, and/or as any other type of similar device.

Device 700 includes one or more media content inputs 702 that may include Internet Protocol (IP) inputs over which streams of media content are received via an IP-based network. Device 700 further includes communication interface(s) 704 that can be implemented as any one or more of a serial and/or parallel interface, a wireless interface, any type of network interface, a modem, and as any other type of communication interface. A network interface provides a connection between device 700 and a communication network by which other electronic and computing devices can communicate data with device 700.

Similarly, a serial and/or parallel interface provides for data communication directly between device 700 and the other electronic or computing devices. A modem also facilitates communication with other electronic and computing devices via a conventional telephone line, a DSL connection, cable, and/or other type of connection. A wireless interface enables device 700 to receive control input commands 706 and other data from an input device, such as from remote control device 708, a portable computing-based device (such as a cellular phone), or from another infrared (IR), 802.11, Bluetooth, or similar RF input device.

Device 700 also includes one or more processors 710 (e.g., any of microprocessors, controllers, and the like) which process various computer-executable instructions to control the operation of device 700, to communicate with other electronic and computing devices, and to implement embodiments of on-demand asset distribution. Device 700 can be implemented with computer-readable media 712, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 712 provides data storage mechanisms to store media content 714, as well as computer applications and any other types of information and/or data related to operational aspects of device 700. For example, an operating system 716 can be maintained as a computer application with the computer-readable media 712 and executed on processor(s) 710 to implement embodiments of on-demand asset distribution.

The computer applications can include an asset manager 718 when device 700 is implemented as a content distributor, and/or can include a media manager 720 when implemented as a television client device. The asset manager 718 and the media manager 720 are shown as software modules in this example to implement various embodiments of on-demand asset distribution as described herein. An example of the asset manager 718 is described with reference to asset manager 316 for content distributor 302 as shown in FIG. 3, and an example of the media manager 720 is described with reference to media manager 138 for client device 102 as shown in FIG. 1.

When implemented as a television client device, the device 700 can also include a DVR system 722 with playback application 724, and recording media 726 to maintain recorded media content 728 that device 700 receives and/or records.

The recorded media content 728 can include the media content 714 that is received from a content distributor and recorded. For example, the media content 728 can be recorded when received as a viewer-scheduled recording, or when the recording media 726 is implemented as a pause buffer that records the media content 728 as it is being received and rendered for viewing. In various embodiments of on-demand asset distribution, the recorded media content 728 is an example of an on-demand asset 730 that includes any one or combination of video data 732, audio data 734, security data 736, and/or metadata 738.

Further, device 700 may access or receive additional recorded media content that is maintained with a remote data store (not shown). Device 700 may also receive media content from a video-on-demand server, or media content that is maintained at a broadcast center or content distributor that distributes the media content to subscriber sites and client devices. The playback application 724 can be implemented as a media control application to control the playback of media content 714, the recorded media content 728, the on-demand asset 730, and/or any other audio, video, and/or image media content which can be rendered and/or displayed for viewing.

Device 700 also includes an audio and/or video output 740 that provides audio and/or video data to an audio rendering and/or display system 742. The audio rendering and/or display system 742 can include any devices that process, display, and/or otherwise render audio, video, and image data. Video signals and audio signals can be communicated from device 700 to a display device via an RF (radio frequency) link, S-video link, composite video link, component video link, DVI (digital video interface), analog audio connection, or other similar communication link. Alternatively, the audio rendering and/or display system 742 can be implemented as integrated components of the example device 700.

Figure 8:
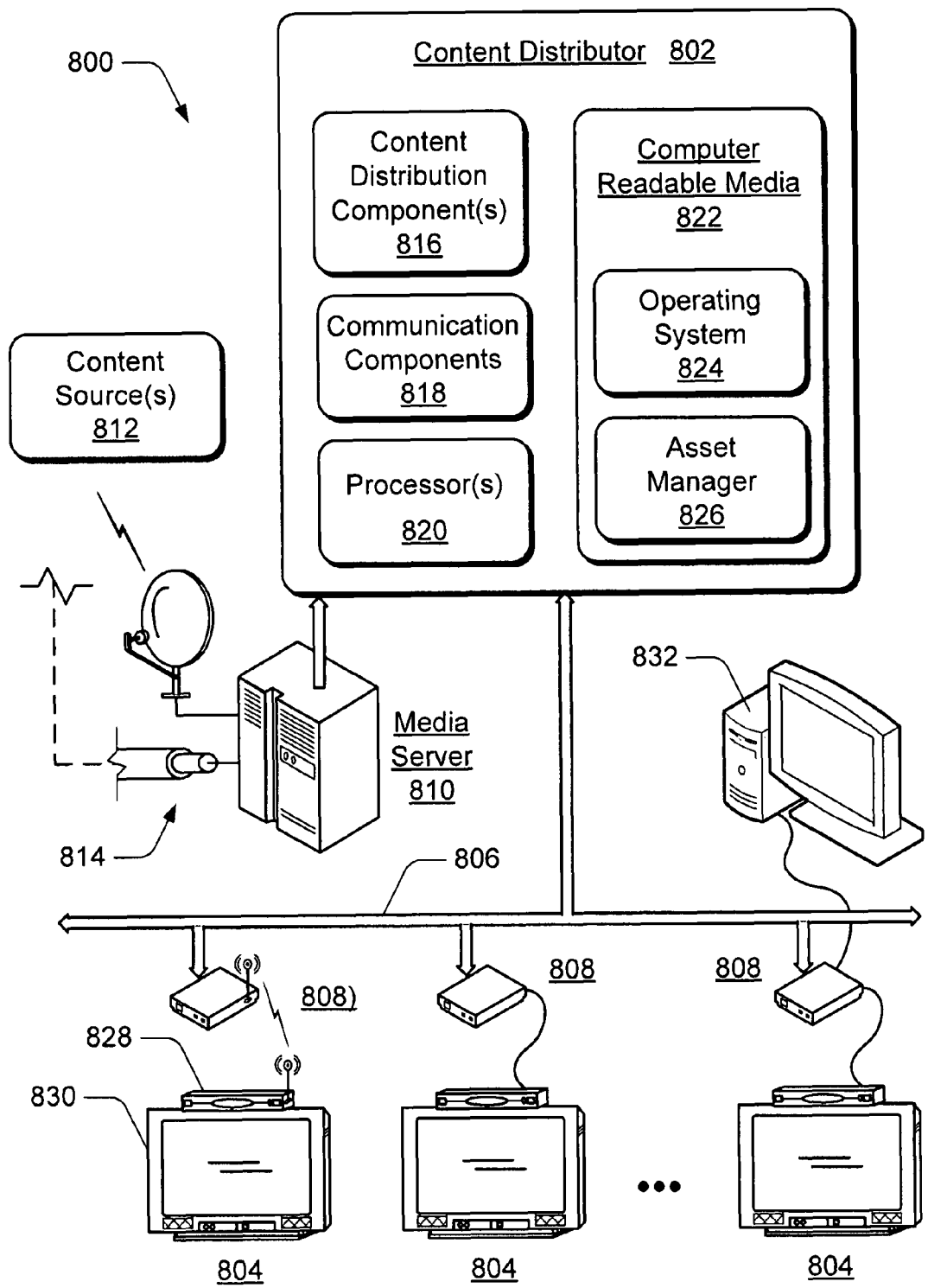
FIG. 8 illustrates various devices and components in an example entertainment and information system in which embodiments of on-demand asset distribution can be implemented.

FIG. 8 illustrates an example entertainment and information system 800 in which embodiments of on-demand asset distribution can be implemented. System 800 facilitates the distribution of media content, program guide data, and/or advertising content to multiple viewers and viewing systems. System 800 includes a content distributor 802 and any number of client systems 804 each configured for communication via a communication network 806. Each of the client systems 804 can receive data streams of media content, program content, program guide data, advertising content, closed captions data, and the like from content server(s) of the content distributor 802 via the communication network 806.

The communication network 806 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 806 can be implemented using any type of network topology and any network communication protocol, and can be represented or otherwise implemented as a combination of two or more networks. A digital network can include various hardwired and/or wireless links 808, such as routers, gateways, and so on to facilitate communication between content distributor 802 and the client systems 804.

System 800 includes a media server 810 that receives content from various content sources 812, such as media content from a content provider, program guide data from a program guide source, and advertising content from an advertisement provider. In an embodiment, the media server 810 represents an acquisition server that receives audio and video content from a provider, an EPG server that receives the program guide data from a program guide source, and/or an advertising management server that receives the advertising content from an advertisement provider.

The content sources, such as the content provider, program guide source, and the advertisement provider control distribution of the media content, the program guide data, and the advertising content to the media server 810 and/or to other servers of system 800. The media content, program guide data, and advertising content can be distributed via various transmission media 814, such as satellite transmission, radio frequency transmission, cable transmission, and/or via any number of other wired or wireless transmission media. In this example, media server 810 is shown as an independent component of system 800 that communicates the program content, program guide data, and advertising content to content distributor 802. In an alternate implementation, media server 810 can be implemented as a component of content distributor 802.

Content distributor 802 is representative of a headend service in a content distribution system, for example, that provides the media content, program guide data, and advertising content to multiple subscribers (e.g., the client systems 804). The content distributor 802 can be implemented as a satellite operator, a network television operator, a cable operator, and the like to control distribution of media content, program and advertising content, such as movies, television programs, commercials, music, and any other audio, video, and/or image content to the client systems 804.

Content distributor 802 includes various content distribution components 816 to facilitate media content processing and distribution, such as a subscriber manager, a device monitor, and one or more content servers. The subscriber manager manages subscriber data, and the device monitor monitors the client systems 804 (e.g., and the subscribers), and maintains monitored client state information.

Although the various managers, servers, and monitors of content distributor 802 (to include the media server 810 in one embodiment) are described as distributed, independent components of content distributor 802, any one or more of the managers, servers, and monitors can be implemented together as a multi-functional component of content distributor 802. Additionally, any one or more of the managers, servers, and monitors described with reference to system 800 can implement features and embodiments of on-demand asset distribution.

The content distributor 802 includes communication components 818 that can be implemented to facilitate media content distribution to the client systems 804 via the communication network 806. The content distributor 802 also includes one or more processors 820 (e.g., any of microprocessors, controllers, and the like) which process various computer-executable instructions to control the operation of content distributor 802. The content distributor 802 can be implemented with computer-readable media 822 which provides data storage to maintain software applications such as an operating system 824 and an asset manager 826. The asset manager 826 can implement one or more embodiments of on-demand asset distribution as described with reference to asset manager 316 for content distributor 302 shown in FIG. 3.

The client systems 804 can each be implemented to include a client device 828 and a display device 830 (e.g., a television, LCD, and the like). A client device 828 of a respective client system 804 can be implemented in any number of embodiments, such as a set-top box, a digital video recorder (DVR) and playback system, an appliance device, a gaming system, and as any other type of client device that may be implemented in an entertainment and information system. In an alternate embodiment, a client system 804 may implemented with a computing device 832 as well as a client device. Additionally, any of the client devices 828 of a client system 804 can implement features and embodiments of on-demand asset distribution as described herein.

Although embodiments of on-demand asset distribution have been described in language specific to features and/or methods, it is to be understood that the subject of the appended claims is not necessarily limited to the specific features or methods described. Rather, the specific features and methods are disclosed as example implementations of on-demand asset distribution.

The invention claimed is:

1. A method, comprising:

maintaining independently, by a client device, video data of an on-demand asset received from a content distributor, the on-demand asset initially being comprised of at least the video data, audio data, metadata, and security data, wherein the on-demand asset was originally received by the client device as network broadcast content from the content distributor and wherein the security data comprises at least encryption keys;

allocating, by the client device, a percentage of upstream bandwidth for distribution of one or more segments of the video data and metadata corresponding to the one or more segments of the video for the on-demand asset when requested by one or more television client devices;

receiving, with the client device, a request for the on-demand asset from a television client device;

communicating, using the client device, the one or more segments of the video data and the metadata corresponding to the one or more segments of the video for the on-demand asset to the television client device utilizing the allocated upstream bandwidth without communicating the security data that corresponds to the one or more segments of the video data for the on-demand asset using the client device, wherein the one or more segments of the video data for the on-demand asset are configured to be combined, by the television client device, with the audio data and the security data that is received from the content distributor; and communicating, using the client device, the audio data for the on-demand asset to the content distributor, wherein the audio data communicated by the client device is configured to be processed with the audio data from multiple other client devices for distribution.

2. A method as recited in claim 1, further comprising:

requesting an additional on-demand asset from the content distributor;

receiving a list of other client devices from which the additional on-demand asset can be requested;

requesting the additional on-demand asset from the other client devices; and receiving segments of video data for the additional on-demand asset from one or more of the other client devices.

3. A method as recited in claim 2, wherein the additional on-demand asset is comprised of at least the video data, audio data, and security data, and wherein the segments of the video data for the additional on-demand asset are received from the one or more other client devices.

4. A method as recited in claim 3, further comprising receiving the audio data and the security data of the additional on-demand asset from the content distributor.

5. A television client device, comprising:

a recording media configured to maintain video data of an on-demand asset received from a content distributor, the on-demand asset being comprised of at least the video data, audio data, metadata, and security data, wherein the on-demand asset was originally received as network broadcast content by the television client device from the content distributor and wherein the security data comprises at least encryption keys;

a media manager configured to:

allocate a percentage of upstream bandwidth to the content distributor responsive to a request received from an additional television client device;

receive a request from the additional television client device for the on-demand asset;

communicate one or more segments of the video data and the metadata that corresponds to the one or more segments of the video data for the on-demand asset to the additional television client device without communicating the security data that corresponds to the one or more segments of the video data for the on-demand asset from the television client device, wherein the one or more segments of the video data for the on-demand asset are configured to be combined, by the additional television client device, with the audio data and the security data that is received from the content distributor; and communicate the audio data for the on-demand asset to the content distributor, wherein the audio data communicated by the television client device is configured to be processed with the audio data from multiple other client devices for distribution.

6. A television client device as recited in claim 5, wherein the media manager is further configured to:

initiate a request for an additional on-demand asset from the content distributor;

receive a list of other television client devices that have been distributed the additional on-demand asset;

communicate a request for the additional on-demand asset to the other television client devices that provide segments of video data for the additional on-demand asset to the television client device.

7. A television client device as recited in claim 6, further comprising a media content input configured to receive the segments of the video data for the additional on-demand asset from one or more of the other television client devices.

8. A television client device as recited in claim 6, wherein the additional on-demand asset is comprised of at least the video data, audio data, and security data; the television client device further comprising a media content input configured to:

receive the segments of the video data for the additional on-demand asset from the one or more other television client devices; and receive the audio data and the security data of the additional on-demand asset from the content distributor.

9. A television client device as recited in claim 6, wherein the additional on-demand asset is comprised of at least the video data, audio data, and security data; the television client device further comprising a media content input configured to:

receive the segments of the video data and the audio data for the additional on-demand asset from the one or more other television client devices; and receive the security data of the additional on-demand asset from the content distributor.

10. A content distributor, comprising:
storage media configured to maintain on-demand assets that can each be requested by client devices that store encrypted video data of the on-demand assets for on-demand viewing, wherein at least some of the on-demand assets are originally received as broadcast content by the content distributor from a network television source, wherein at least some of the on-demand assets are comprised of data types including at least the encrypted video data, audio data, metadata, and security data which are maintained separately to permit independent distribution of a data type, wherein the security data comprises at least encryption keys;
an asset manager configured to:
    receive requests from the client devices for an on-demand asset originally received as broadcast content from a network television source;
    initiate distribution of the on-demand asset to the client devices;
    maintain a list of the client devices that have been distributed the on-demand asset;
    receive a new request from an additional client device for the on-demand asset;
    initiate the additional client device receiving segments of the encrypted video data and the metadata that corresponds to the segments of the encrypted video data for the on-demand asset without receiving the security data that corresponds to the segments of the encrypted video data from one or more of the client devices that store the encrypted video data of the on-demand asset;
    initiate distribution of the security data that corresponds to the encrypted video segments to the additional client device from the content distributor;
    receive the audio data of the on-demand asset from multiple of the client devices that store the audio data of the on-demand asset;
    process the received audio data for distribution; and
    initiate distribution of the audio data of the on-demand asset to the additional client device.

11. A content distributor as recited in claim 10, wherein the asset manager is further configured to initiate the additional client device receiving the segments of the encrypted video data for the on-demand asset by communicating a list of the client devices that store the encrypted video data of the on-demand asset to the additional client device that then requests the segments of the encrypted video data for the on-demand asset from the one or more client devices.

12. A content distributor as recited in claim 10, wherein the asset manager is further configured to initiate the additional client device receiving the segments of the encrypted video data for the on-demand asset by directing the one or more client devices to each communicate one or more of the segments of the encrypted video data for the on-demand asset to the additional client device.

13. A content distributor as recited in claim 10, wherein the asset manager is further configured to maintain the list of the client devices and an allocation of upstream bandwidth from each of the client devices that communicate the segments of the encrypted video data for the on-demand asset to the additional client device.

14. A content distributor as recited in claim 10, further comprising a security component configured to distribute the encryption keys to the additional client device to decrypt the segments of the encrypted video data for the on-demand asset received from the one or more client devices.

15. A content distributor as recited in claim 10, wherein the asset manager is further configured to:
    initiate the additional client device receiving the segments of the encrypted video data for the on-demand asset from the one or more client devices.

16. A content distributor as recited in claim 10, wherein the asset manager is further configured to:
    initiate the additional client device receiving the segments of the encrypted video data for the on-demand asset from the one or more client devices.

17. A content distributor as recited in claim 16, further comprising a security component configured to distribute the security data to the additional client device to decrypt the encrypted video data received from the one or more client devices.

* * * * *